July 24, 1962 S. D. RAEZER 3,045,487
METHOD FOR THE MEASUREMENT OF EXTREME
TEMPERATURES AND MEANS THEREFOR
Filed Feb. 6, 1961

SPENCER D. RAEZER
INVENTOR.

BY 
ATTORNEY

United States Patent Office 3,045,487
Patented July 24, 1962

3,045,487
METHOD FOR THE MEASUREMENT OF EXTREME TEMPERATURES AND MEANS THEREFOR
Spencer D. Raezer, Montgomery County, Md.
(13014 Turkey Branch Parkway, Rockville, Md.)
Filed Feb. 6, 1961, Ser. No. 87,377
19 Claims. (Cl. 73—339)

This invention relates to temperature measurement and more particularly to a method and a means that are especially suitable for measuring temperatures in the region above the melting point of metals where thermocouples and other conventional direct contact thermometric devices cannot be used.

Recent increased activities in fields utilizing high temperature gas and plasmas have raised the problem of measurement of these extremely high temperatures. In the region above 4000 degrees centigrade no simple, satisfactory device for the measurement of temperature exists. Optical methods have been employed, but these are cumbersome and the results are often difficult to interpret, especially in the case of non-equilibrium among the various internal states of the gas.

It is the purpose, therefore, of the present invention to provide a simple yet dependable method and means for measuring the effective temperature of a high velocity stream of a very high gas or plasma in the region of a material body placed in the stream. The present invention will permit the measurement of extremely high temperatures in the region above the melting point of solid materials without destruction of the sensing element. Not only are accuracies of a high order attainable, but these desirable results are achieved quickly and without extensive supplementary calculations.

Figure 1:
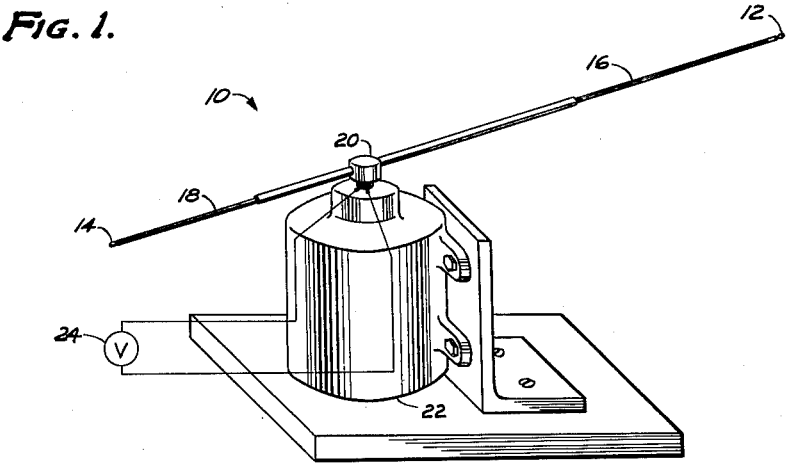
Figure 2:
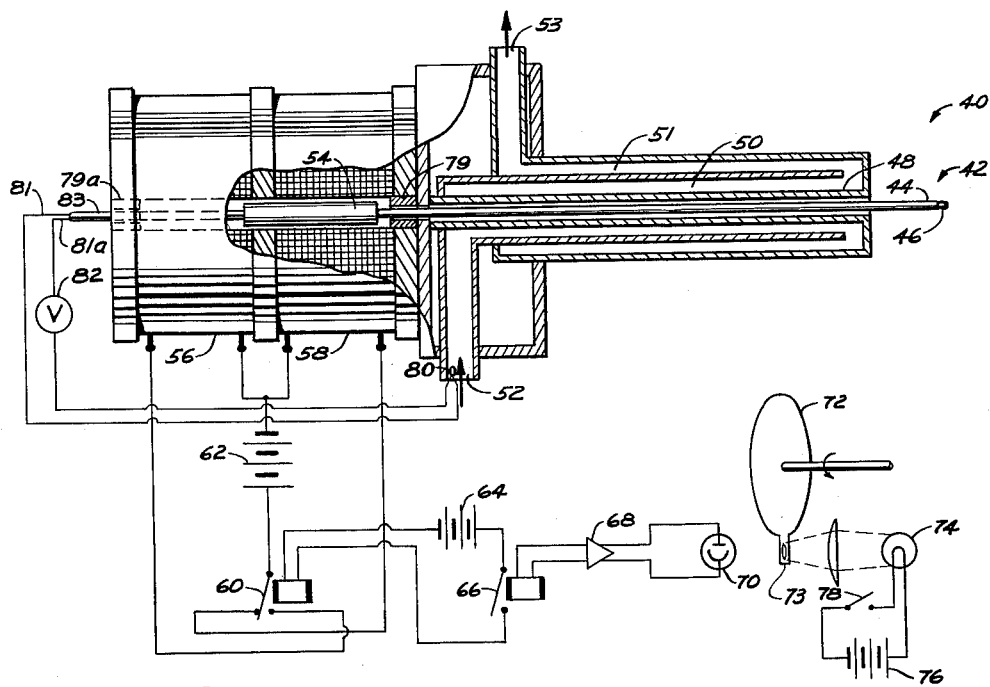
Figure 2:

These and other objects and advantages of the present invention will readily be appreciated as the same becomes understood by reference to the following detailed description when considered with the accompanying drawings in which:

FIG. 1 is a perspective of one embodiment of the present invention involving a sweep probe, and FIG. 2 is an elevation partly in section of another embodiment of the present invention utilizing a reciprocating probe.

The basic concept of the present invention contemplates the periodic cycling of temperature sensing element between a hot gas whose temperature is to be measured and a cooler body or reservoir into which a portion of the heat picked up in the hot region by the sensing element is released. After a number of cycles during which the sensing element passes alternately from the hot region to the cold reservoir, a steady equilibrium temperature is attained by the sensor. Since at equilibrium the heat being picked up in the hot region is equal to that being released in the cooler region, the temperature in the hot region may be calculated from the equilibrium temperature difference between the sensing element and the cold region and from a knowledge of the heat transfer in both regions. In general, the heat transfer between the hot gas and the temperature sensor is not known, though it may be measured. It is usually assumed that the heat transfer is a linear function of the temperature difference and depends only slightly on the velocity of the gas, this relationship having been substantiated experimentally for lower temperature gas streams where the temperature may be measured by direct contact devices. However, in gases whose temperature is too high to be measured directly, verification of this law becomes more difficult. The method and means of the invention herein described avoids the direct measurement of heat transfer or the theoretical calculation thereof, and obtains the gas temperature directly in terms of the equilibrium temperature of the sensor and the cycling ratio R which is the ratio of the time spent in the cool region to that spent in the hot region.

In accordance with the theory of the present invention, a reservoir $R_c$ is maintained at a temperature $\theta_c$ and a second reservoir $R_h$ is maintained at a higher temperature $\theta_h$. A body B is arranged to pass in a periodic manner with period $\lambda$ between the reservoirs $R_c$ and $R_h$, spending a time $t$ in $R_h$ and a time $(\lambda - t)$ in $R_c$. The ratio $(\lambda - t)/t$ is selected such that the body B does not reach $\theta_h$ in $R_h$ or $\theta_c$ in $R_c$. In this case the mean temperature of the body B will come to some average equilibrium temperature $\overline{\theta}_B$ at which time the heat gained in the reservoir $R_h$ is equal to that lost in the reservoir $R_c$, thus permitting the following relationship to obtain:

$$\int^t Q_h dt = \int^{\lambda-t} Q_c dt \qquad (1)$$

where the heat fluxes, $Q_h$ and $Q_c$, of the hot and cold reservoirs, respectively, are functions of the temperature differences as shown below:

$$Q_h = f(\theta_h - \theta_B)$$
$$Q_c = f'(\theta_B - \theta_c) \qquad (2)$$

It is to be understood that $\theta_B$ indicates the instantaneous temperature of the body B. When $\lambda$ is made sufficiently small that the variation in $\theta_B$ is linear, it has been proven mathematically that $\theta_B = \overline{\theta}_B$ to a high degree of approximation in the relationship of (2) above under the conditions which follow.

Assuming that the heat fluxes are linear functions of the temperature differences, from (1) and (2), $$h_h(\theta_h - \overline{\theta}_B)t = h_c(\overline{\theta}_B - \theta_c)(\lambda - t) \qquad (3)$$

whence, if H equals the ratio of the coefficient of heat transfer in the cold reservoir to the coefficient in the hot region $$\left(\frac{h_c}{h_h}\right)$$

and if $$R \text{ equals } \frac{(\lambda - t)}{t} \text{ or } \frac{\lambda}{t} - 1$$

$$\theta_h - \theta_c = (\overline{\theta}_B - \theta_c)(1 + HR) \qquad (4)$$

Therefore, knowing H and R, one can calculate $\theta_h$ from $\overline{\theta}_B$ and $\theta_c$. However, since H is generally not known, if R is varied to produce a new value for the equilibrium temperature of the body B, the temperature of the hot region $\theta_h$ may be readily determined from a knowledge of the old and new values of the equilibrium temperature $\overline{\theta}_B$ and the corresponding values of R. That this is true may be shown by letting $\theta_c$ represent the reference temperature in Equation 4 so that in equating the two sets of conditions, $$\overline{\theta}_B(1 + HR) = \overline{\theta}_B'(1 + HR') \qquad (5)$$

and solving for H, gives $$H = \frac{\overline{\theta}_B' - \overline{\theta}_B}{\overline{\theta}_B' R' - \overline{\theta}_B R} \qquad (6)$$

Then if this expression for H is inserted in Equation 4

$$\theta_h = \overline{\theta}_B + \frac{\overline{\theta}_B' - \overline{\theta}_B}{1 - \frac{\overline{\theta}_B' R'}{\overline{\theta}_B R}} \qquad (7)$$

It is seen that for the ideal case, where $H=1$, $$\theta_h = \frac{\lambda}{t}\bar{\theta}_B \qquad (8)$$

By using more than two cycling ratios R, H and $\theta_h$ may be overdetermined. Since the two values of H computed from three cycling ratios, or in general, the $$\frac{n}{2}(n-1)$$

values of H computed from $n$ cycling ratios, must agree if the heat transfer in both regions is linear, a means is obtained by which it can be ascertained whether or not the heat transfer is truly linear. For example, since from the equation $$\theta_h = \bar{\theta}_B(1+HR) \qquad (9)$$

the following will obtain:

$$\frac{1}{\bar{\theta}_B} = \frac{1}{\theta_h} + \frac{HR}{\theta_h}$$

A graphic plot of $1/\bar{\theta}_B$ against R for more than two measured values of $\bar{\theta}_B$ and R yields a straight line with intercept $1/\theta_h$ and slope $H/\theta_h$.

In practice, a device may be provided which has suitable linear heat transfer characteristics and which defines the temperature in accordance with the preceding analysis. Such a device is herein described in several embodiments.

In FIG. 1 is shown one embodiment of the present invention in the form of a sweep probe 10. This device comprises a pair of thermocouples 12 and 14 mounted on the ends of opposing arms 16 and 18, respectively, of different lengths. The arms 16 and 18 are secured to a hub 20 which is mounted to and rotates with the shaft of a motor 22. The thermocouples 12 and 14 are connected electrically in series opposition so that the difference in their voltages can be read, a slip ring commutator making the connection from the thermocouples to a voltage measuring device 24. The device 24 may be a galvanometer or, if preferred, a recording potentiometer.

One thermocouple, preferably the one mounted on the longer arm, shown as thermocouple 12 on arm 16 in FIG. 1, is positioned to sweep alternately through the hot gas region to be measured and the cool surroundings, while the other sweeps only through the surroundings and acts as the cold junction or reference couple, responding to the ambient temperature. Because the thermocouple 12 receives heat rapidly in passing through the hot region and is cooled less rapidly in the cold region, some steady equilibrium temperature $\bar{\theta}_B$ is eventually reached.

If the frequency of rotation is high enough, convection will be the principal mechanism of heat transfer in both regions, and if the gas velocity is small compared to the linear sweep velocity and the composition of hot and cold gas not too different, H will be essentially unity.

It has been found that if the ratio of the thermal capacity of the thermocouple 12 to the coefficient of heat transfer in the hot region is much greater than $t$, then the departure of $\theta_B$ from its average value $\bar{\theta}_B$ during a cycle will be negligibly small and Equation 8 will apply. Although this equation omits several terms, the largest being convection down the stem of the thermocouple 12 and radiation loss during the heating cycle, these are negligible if the temperature $\bar{\theta}_B$ is not allowed to become too high.

In the case where H does not equal unity, several values of $\bar{\theta}_B$ corresponding to various values of R are required for substitution in Equation 7 in order that the temperature of the hot region $\theta_h$ may be determined therefrom. The different values of R are obtained by varying the periodic cycling ratio of the thermocouple in and out of the hot region, which in this case would be accomplished by altering the sweep radius of that thermocouple. This may be readily done by interchanging the roles of the arms 16 and 18, allowing first one, then the other, to carry its associated thermocouple in and out of the hot region. Another method by which the cycling ratio may be varied is one in which the arm 16 is of telescoping design so that its length may be varied to provide various sweep radii. In this latter arrangement, the thermocouple 12 would in each case be the one which would sweep alternately through the hot and cold regions in measuring the various values of the equilibrium temperature $\bar{\theta}_B$ for each value of the cycling ratio R.

FIG. 2 depicts a second embodiment of the present invention which is more adaptable for use in restricted regions where the walls of a confining chamber would prevent the utilization of a sweeping probe. In this second arrangement, a reciprocating probe 40 is provided by mounting a sensing element such as a thermocouple 42 on a rod 44, the tip 46 of the thermocouple being positioned at one end of the rod. Surrounding the rod 44 and slidably engageable therewith is a tube 48 having a plurality of passages 50 and 51 therein to permit circulation of a coolant such as water from an inlet 52 through the passages to an outlet 53. It will be noted that the passage 50 is coupled to the inlet 52 and is arranged such that it immediately surrounds the tube 48 so that the interior of the tube is essentially the same temperature as the incoming coolant.

Secured to the other end of the rod 44 is an iron driver 54 which acts under the influence of a pair of solenoid coils 56 and 58 to move the probe 40 in a reciprocating manner as the coils are alternately energized. For the purpose of energizing the coils 56 and 58 in an alternate fashion, circuitry is provided including a D.C. source of electrical energy 62 which is coupled to the coils in parallel manner, a high current solenoid switch 60 serving to connect one or the other of the coils to the D.C. source. In the arrangement depicted in FIG. 2, for a reason to be hereinafter stated, the switch 60 is preferably spring biased in a switch position that will permit the coil 58 to be coupled to the D.C. source when the solenoid of that switch is unenergized. Connected to the solenoid of the switch 60 is a second source of D.C. energy 64 and a sensitive solenoid switch 6, the latter being biased, of course, in the open position. The solenoid of the switch 66 is energized through an amplifier 68 which receives its input signal from a photocell 70. Positioned in close proximity to the photocell 70 is a light source 74 such as an incandescent lamp that is connected to a source of electrical energy 76 through a switch 78.

Interposed between the light source 74 and the photocell 70 is chopper wheel 72 driven by a motor (not shown). The configuration of the chopper wheel is such that a light beam passing from the source 74 to the photocell is interrupted by a blade 73 on the chopper wheel thus interrupting the energization of the photocell a relatively short period of the total time required for one revolution of the wheel. This arrangement, in conjunction with the properly spring biased solenoid switches 60 and 66, causes the coil 58 to be energized only a relatively short period of the total time that both coils are energized. This relationship is important since it is desirable, as will be seen, that the coils 56 and 58 act accordingly on the iron driver 54 to move the probe 40 in a proper manner.

Properly positioned with respect to the coils 56 and 58 are limits 79 and 79a which engage and restrict the movement of the iron driver 54 such that the reciprocating motion of the probe 40 moves the thermocouple tip 46 in and out of the end of the tube 48. Thus if the probe 40 is properly positioned in the proximity of a hot region, the tip 46 may be alternately subjected to the temperatures of the hot region and a cooler region, that is, the interior of the cooled tube 48, by the reciprocating motion of the probe 40. Because of the configuration of the chopper wheel 72 and the circuitry associated with the coils 56 and 58, the iron driver is under the influence of the coil 58 only a fraction of the total time it is affected by both coils. The resulting in and out excursions of the probe 40 are such that the thermocouple tip 46 spends only a fraction of the time outside the cooled tube and in the hot region as compared to the time it is in the confines of the cooled tube.

A second thermocouple 80, representing the reference couple, is located at the coolant inlet 52 and is connected in series opposition to the thermocouple 42 by means of wires 81 and 81a. For the purpose of accommodating therewithin the wires 81 and 81a, the rod 44 is preferably made of hollow cylindrical construction. In similar fashion, the driver 54 may be provided with a longitudinal bore in order to permit the same wires to pass therethrough, a second hollow rod 83 being coupled to the other side of the driver to allow the wires to be passed out the rear of the coil 56. In order that the difference in voltage produced by the two thermocouples may be determined, a voltage indicating device 82 such as a galvanometer or recording potentiometer is coupled therebetween.

In operation, the probe 40 is located in the proximity of the hot region to be measured and is positioned such that the thermocouple tip 46, when it projects from the tube 48, is in the hot region. The switch 78 is closed and, assuming that the blade 73 of the chopper wheel 72 is not in an obstructive position, energization of the light source 74 generates a signal from the photocell 70 to the amplifier 68. The amplified signal then closes the sensitive solenoid switch 66 which in turn causes the high current switch to close in a position that will produce energization of the coil 56. This maintains the thermocouple tip 46 in a withdrawn position so that there will be no prolonged exposure thereof to the hot region. The chopper wheel 72 is then rotated at a given rate, the blade interrupting the energization of the photocell 70, thereby causing alternate energization of the coils 56 and 58 according to the configuration of the chopper wheel. This of course causes the iron driver 54 to move the rod 44 and thermocouple tip 46 to move in and out of the hot region at a predetermined period. That is, the configuration of the chopper wheel 72 determines the cycling ratio R which is the ratio of the time the thermocouple 42 spends in the cooler region to the time it spends in the hot region, this ratio being proportional to the ratio of the circumference of the wheel less the blade width to the blade width. As the thermocouple tip 46 is being cycled between the hot region and the interior of the cooled tube 48, an equilibrium temperature $\bar{\theta}_B$ is eventually reached by the thermocouple. The configuration of the chopper wheel is then changed so that a different ratio of circumference less blade width to blade width is effected, various ways of producing this configuration change being possible. For example, several wheels of different geometry and having different shafts could be arranged, along with associated circuitry, to be interchangeably interposed between the photocell 70 and the light source 74. Another method would involve a single chopper wheel having a blade whose width could be varied as desired.

A second value of the equilibrium temperature $\bar{\theta}_B$ is then obtained by cycling the thermocouple tip 46 in and out of the hot region according to the second cycling ratio R as determined by the second chopper wheel. In order to obtain the temperature of the hot region $\theta_h$, these values of $\bar{\theta}_B$ and R are then substituted in Equation 7. Or, if preferred, the cycling ratio can be further varied to obtain additional values of the equilibrium temperature which can be plotted along with the other values previously obtained. As was described in conjunction with the sweep version of the present invention, the reciprocal of the equilibrium temperature is plotted as the ordinate against the cycling ratio as the abscissa. Thus, in accordance with Equation 10, the resulting plot yields a straight line which intercepts the axis of ordinates at a point which indicates the reciprocal of the temperature of the hot gas.

Obviously many modifications and variations of the present invention are possible in the light of the above teachings. It is therefore to be understood that within the scope of the appended claims, the invention may be practiced otherwise than as specifically described.

What is claimed is:

1. A method for determining the temperature of a gas having a relatively high temperature, comprising the steps of cycling a temperature sensing element between the hot gas and a cooler region at a first period and in accordance with a first cycling ratio until a first equilibrium temperature is attained by the sensing element, subsequently cycling said temperature sensing element between said hot gas and cooler region at a second period and in accordance with a second cycling ratio until a second equilibrium temperature is attained by the sensing element, and calculating the temperature of the hot gas from the expression:

$$\theta_h = \bar{\theta}_B + \frac{\bar{\theta}_B' - \bar{\theta}_B}{1 - \frac{\bar{\theta}_B' R'}{\bar{\theta}_B R}}$$

where
$\theta_h$ is the temperature of the hot gas,
$\bar{\theta}_B$ is said first equilibrium temperature,
$\bar{\theta}_B'$ is said second equilibrium temperature,
R is said first cycling ratio and is equal to the ratio of the time that the sensing element spends in the cooler region to the time the sensing element spends in the hot region, according to said first cycling period, and
R' is said second cycling ratio and is equal to the ratio of the time that the sensing element spends in the cooler region to the time the sensing element spends in the hot region, according to said second cycling period.

2. The method as recited in claim 1 wherein said first and second periods of cycling are equal.

3. A method of determining the temperature of a hot gas comprising the steps of cycling a temperature sensing element between said hot gas and a cooler region in accordance with a first and a second cycling ratio until first and second equilibrium temperatures, respectively, are attained by said temperature sensing element, and calculating the temperature of said hot gas from the expression:

$$\bar{\theta}_B + \frac{\bar{\theta}_B' - \bar{\theta}_B}{1 - \frac{\bar{\theta}_B' R'}{\bar{\theta}_B R}}$$

where R and R' are said first and second cycling ratios, respectively, and are equal to the ratio of the time that said sensing element spends in said cooler region to the time said sensing element spends in the hot gas according to said first and second cycling ratios, respectively, and
where $\bar{\theta}_B$ and $\bar{\theta}_B'$ are said first and second equilibrium temperatures, respectively.

4. A method of determining the temperature of a hot gas comprising the steps of cycling a temperature sensing element between said hot gas and a cooler region in accordance with at least three different cycling ratios until equilibrium temperatures are attained by said sensing element for said cycling ratios, respectively, and making a plot of the reciprocal of each of the values of said equilibrium temperatures as ordinates against the different values of said cycling ratios, as abscissas, whereby the intercept of said plot with the axis of ordinates indicates the reciprocal of the temperature of said hot gas.

5. A device for determining the temperature of a hot gas, comprising, a temperature sensing element, means for periodically cycling said temperature sensing element between said hot gas and a cooler region according to a cycling ratio, and control means for varying the cycling ratio of said temperature sensing element.

6. A device for determining the temperature of a hot gas, comprising, a temperature sensing element, an arm for carrying said sensing element and having an adjustable length, and means for cycling said arm and sensing element between said hot gas and a cooler region, said means including a motor having a shaft, said arm being coupled to said shaft in such manner as to be rotated in a plane normal to the longitudinal axis of said shaft upon the rotation thereof.

7. A device for determining the temperature of a hot gas, comprising, a first and a second temperature sensing element, means including a pivotable member for cycling said first temperature sensing element between said hot gas and a cooler region according to a cycling ratio and for subjecting said second temperature sensing element to the temperature of said cooler region, indicating means for reflecting the temperature difference between said first and second temperature sensing elements, and means for varying the cycling ratio of said first temperature sensing element.

8. The device as recited in claim 7 wherein said last mentioned means includes structure for changing the length of said pivotable member.

9. A device for determining the temperature of a hot gas comprising, a first and a second temperature sensing element, an arm for carrying said sensing elements, said sensing elements being arranged on said arm in such fashion that either one of sensing elements may be subjected alternately to the temperatures of said hot gas and a cooler region as the other sensing element is being subjected to the temperature of said cooler region only, and means including a motor coupled to said arm for effecting periodic cycling of either one of said sensing elements between said hot gas and said cooler region and for subjecting the other of said sensing elements to the temperature of said cooler region.

10. The invention as recited in claim 9 wherein said arm for carrying said sensing elements is adjustable in length.

11. A device for determining the temperature of a hot gas comprising, a first and a second temperature sensing element, a member for carrying said sensing elements and having a pivot point thereon to define a long and a short lever arm, said first sensing element being coupled to said long lever arm, said second sensing element being coupled to said short lever arm, means for moving said long lever arm about said pivot point and subjecting said first sensing element alternately to the temperatures of said hot gas and a cooler region, said means simultaneously moving said short lever arm about said pivot point and subjecting said second sensing element continuously to the temperature of said cooler region, indicating means for reflecting the temperature difference between said first and second sensing elements.

12. The device as recited in claim 11 with additionally means for changing the length of one of said lever arms.

13. A measuring device for determining the temperature of a hot region, comprising, a first and a second temperature sensing element, driving means for periodically cycling said first sensing element between said hot region and a cooler region according to a cycling ratio, means for subjecting said second sensing element to the temperature of said cooler region, indicating means for reflecting the difference between said first and second temperature sensing elements, and control means for said driving means for varying the cycling ratio of said first sensing element.

14. A measuring device for determining the temperature of a hot region, comprising, a first and a second temperature sensing element, structure defining a cooler region, said first sensing element being movable from a position within said cooler region to a second position in said hot region, said second sensing element being coupled to said cooler region for sensing the temperature thereof, means for effecting periodic cycling of said first sensing element between said first and second positions according to a cycling ratio, driving means for said aforementioned means and including control means for varying said cycling ratio, and indicating means for reflecting the temperature difference between said first and second temperature sensing elements.

15. The measuring device as recited in claim 14 wherein said structure defining a cooler region includes a member having a chamber therein, an aperture in said member and communicating said chamber with the exterior of said member, said first temperature sensing element being insertable into said chamber through said aperture, and cooling means on said member.

16. The measuring device as recited in claim 15 wherein said cooling means includes coolant passages in said member and communicable with a source of coolant.

17. The measuring device as recited in claim 15 wherein said means for effecting periodic cycling of said first sensing element between said first and second positions includes a rod coupled to said first sensing element for carrying the latter between said chamber and said hot region, and wherein said driving means includes additionally electromagnetic means for effecting reciprocating motion of said rod.

18. A temperature measuring device comprising, a first and a second temperature sensing element, said first sensing element being housed in a chamber and being movable between the interior and the exterior of said chamber, said second sensing element being coupled to said chamber to sense the temperature thereof, driving means for cycling said first sensing element between the interior and exterior of said chamber according to a cycling ratio, and control means for said driving means for varying said cycling ratio.

19. The device as recited in claim 18 with additionally a member for carrying said first sensing element between the interior and exterior of said chamber, and wherein said driving means includes a pair of solenoids coupled to said member, and wherein said control means includes cycling means for alternately energizing said solenoids and having a photocell and a light source, said cycling means also having a variable light interrupting means including a chopper wheel interposed between said photocell and light source.

No references cited.